(12) United States Patent
Hatahori et al.

(10) Patent No.: US 11,181,510 B2
(45) Date of Patent: Nov. 23, 2021

(54) INSPECTION APPARATUS AND INSPECTION METHOD

(71) Applicant: Shimadzu Corporation, Kyoto (JP)

(72) Inventors: Takahide Hatahori, Kyoto (JP); Kenji Takubo, Kyoto (JP); Koki Yoshida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 50 days.

(21) Appl. No.: 16/371,250

(22) Filed: Apr. 1, 2019

(65) Prior Publication Data
US 2020/0191751 A1 Jun. 18, 2020

(30) Foreign Application Priority Data

Dec. 17, 2018 (JP) .............................. JP2018-235310

(51) Int. Cl.
*G01N 29/34* (2006.01)
*G01N 29/04* (2006.01)
*G01N 29/36* (2006.01)

(52) U.S. Cl.
CPC ............. *G01N 29/34* (2013.01); *G01N 29/04* (2013.01); *G01N 29/343* (2013.01); *G01N 29/346* (2013.01); *G01N 29/348* (2013.01); *G01N 29/36* (2013.01); *G01N 2291/0231* (2013.01)

(58) Field of Classification Search
CPC ...... G01N 29/34; G01N 29/04; G01N 29/343; G01N 29/346; G01N 29/348; G01N 29/36; G01N 29/045
See application file for complete search history.

(56) References Cited

U.S. PATENT DOCUMENTS

| | | | | |
|---|---|---|---|---|
| 5,408,881 | A * | 4/1995 | Piche | G01N 29/07 73/582 |
| 6,332,361 | B1 * | 12/2001 | Yamada | G01N 29/11 73/627 |
| 6,401,540 | B1 * | 6/2002 | Deason | G01H 9/00 73/657 |
| 2002/0035872 | A1 * | 3/2002 | Lamouche | G01N 29/4472 73/643 |
| 2004/0089812 | A1 * | 5/2004 | Favro | G01N 29/228 250/341.6 |
| 2005/0132809 | A1 * | 6/2005 | Fleming | G01N 29/0645 73/597 |

(Continued)

FOREIGN PATENT DOCUMENTS

DE 102014207708 A1 * 10/2015 ............ G01N 29/11
JP H10-249474 A 9/1998
(Continued)

OTHER PUBLICATIONS

English Translation of DE102014207708.*
(Continued)

*Primary Examiner* — Helen C Kwok
(74) *Attorney, Agent, or Firm* — Maier & Maier (57) ABSTRACT

Provide an inspection apparatus and an inspection method capable of quickly inspecting a situation of joining between members in a joined body. The inspection apparatus is an inspection apparatus inspecting a situation of joining between a plurality of members in a joined body including the members joined to and overlapped one another.

13 Claims, 8 Drawing Sheets

(56) References Cited

U.S. PATENT DOCUMENTS

| | | | | |
|---|---|---|---|---|
| 2011/0314915 A1* | 12/2011 | Adams | ............... | G01M 5/0066 |
| | | | | 73/582 |
| 2012/0157837 A1* | 6/2012 | Nagata | ................. | A61B 8/4272 |
| | | | | 600/437 |
| 2017/0350690 A1* | 12/2017 | Hatahori | .............. | G01N 29/045 |
| 2018/0283847 A1* | 10/2018 | Hatahori | .............. | G01N 29/045 |
| 2018/0356205 A1* | 12/2018 | Hatahori | ............ | G01B 9/02098 |

FOREIGN PATENT DOCUMENTS

| | | | |
|---|---|---|---|
| JP | 2005098855 A | 4/2005 | |
| JP | 2018132480 A | 8/2018 | |
| WO | 2015/126787 A1 | 8/2015 | |

OTHER PUBLICATIONS

Extended European Search Report dated Oct. 9, 2019, in connection with corresponding EP Application No. 19167258.3; 9 pages.

* cited by examiner

INSPECTION APPARATUS AND INSPECTION METHOD

TECHNICAL FIELD

The present invention relates to an inspection apparatus and an inspection method.

BACKGROUND ART

In the field including a field of automobile parts, a joined body is sometimes obtained with joining a plurality of plate members. In this case, rivets are used for joining the plate members. As a method for inspecting whether a joint portion between plate members with rivets is defective or undefective, for example, the method described in Patent Document 1 has been known. The method described in the Patent Document 1 is carried out in the following procedure.

First, a probe for transmitting a pulse wave (hereinafter referred to as "a first probe") is brought into contact with the vicinity of the rivet of one of the two plate members. Further, a probe for receiving a pulse wave (hereinafter referred to as a "second probe") is brought into contact with the caulking portion of the rivet.

Under these conditions, when the first probe transmits a pulse wave, the second probe receives the pulse wave. At this time, the waveform of the pulse wave received at the second probe varies with the extent of adhesion between the caulking portion of the rivet and one plate member, that is, with whether the joint portion between the plate members is defective or undefective.

In such a manner as the method described in Patent Document 1, it is possible to determine whether the joint portion is defective or not on the basis of the waveform by recording waveform of the pulse wave. However, in this method, only the situation of joining of the joint portion between the first probe and the second probe can be inspected.

Therefore, in a case of sufficiently inspecting the situation of joining of the joint portion over the entire circumference of the caulking portion of the rivet, the positions of the first probe on one plate member is altered over the entire circumference of the caulking portion of the rivet, and it is necessary to record a pulse wave each time. Therefore, it takes long time to complete the inspection.

RELATED ART DOCUMENT

Patent Document

[Patent Document 1] JP-A-10-249474

SUMMARY OF THE INVENTION

Problem to be Solved by the Invention

The present invention has been made to solve the above-mentioned problem (problem that it takes time to complete the inspection). One of objects of the present invention is to provide an inspection apparatus and an inspection method capable of promptly inspecting the situation of joining between members in a joined body.

Means for Solving the Problem

In order to achieve the above-mentioned objects, an inspection apparatus according to one aspect of the present invention is the inspection apparatus that inspects a situation of joining between a plurality of members in a joined body including the members joined to and overlapped one another, and the inspection apparatus have, a vibrating unit that applies a plurality of elastic waves to an observation surface of the joined body under a plurality vibration conditions in which one of frequencies, spatial distribution of amplitudes and/or phases of the elastic waves are different from that of each other conditions, a detection unit that collectively detects spatial distribution of physical quantities relating to displacement of vibration caused by the elastic waves at joint portions between the members or in the vicinities of the joint portions on the observation surface during applying vibration with the vibrating unit, and a processing unit that stores or displays the spatial distribution of the physical quantities detected with the detection unit.

In the inspection apparatus according to one aspect of the present invention, collective imaging of the spatial distribution of physical quantities relating to vibration displacement on the observation surface of the joined body is used, and this collective imaging is performed by applying vibrations under a plurality of vibration conditions to the joined body. Here, the vibration to be collectively imaged is in a spatially steady state on the observation surface by continuously applying elastic waves from the vibrating unit. On the observation surface where the vibration is in a steady state, a region where the amplitude of the vibration becomes extremely small (node of vibration) occurs. For this reason, it is not possible to inspect the situation of joining at a place where a node of the vibration occurs independent of the situation of joining of the members. Therefore, in the present invention, it is possible to inspect the situation of joining at all points on the observation surface by collectively imaging the vibration under a plurality of vibration conditions. Thereby, it is possible to perform a quick inspection of the joined body with a simple configuration.

In the inspection apparatus according to the above aspect, it is preferable that the vibrating unit applies at different timings a plurality of vibrations having different frequencies as vibration conditions.

In the inspection apparatus according to the above aspect, it is preferable that the vibrating unit applies at the same timing a plurality of vibrations having different frequencies as vibration conditions.

In the inspection apparatus according to the above aspect, it is preferable that the vibrating unit applies vibration to the observation surface by means of bringing a vibrator into contact with the observation surface, and then alters the spatial distribution of the amplitudes and the phases of the vibration with changing a contact position of the vibrator on the observation surface.

In the inspection apparatus according to the above aspect, it is preferable that the vibrating unit applies vibration by means of bringing a plurality of vibrators into contact with the observation surface, and then alters spatial distribution of the amplitudes and phases of the vibration by changing the vibration condition applied by each vibrator.

With the above configuration, it is possible to change the vibration condition of vibration through a relatively simple operation.

In the inspection apparatus according to the above aspect, it is preferable that the detection unit includes a light irradiation unit that irradiates the observation surface with light during applying vibration with the vibrating unit.

In the inspection apparatus including the light irradiation unit, it is preferable that the light irradiation unit irradiates with pulsed laser light as the light synchronizing with a period of the vibration applied by the vibrating unit.

In the inspection apparatus that irradiates with the pulsed laser light, it is preferable that the light irradiation unit emits pulsed laser light having at least three different phase differences from the phase of vibration applied with the vibrating unit.

With the above configuration, it is easy to detect the spatial distribution of the physical quantities resulted from the vibration displacement on the observation surface.

In the inspection apparatus according to the above aspect, it is preferable that the detection unit acquires, as the spatial distribution of the physical quantities, an interference image observed by an optical interference method.

In the inspection apparatus according to the above aspect, it is preferable that the processing unit determines that the situation of joining at the joint portion is undefective when a change in physical quantity at the joint portion or in the vicinity of the joint portion is less than a change in physical quantity in a region excluding the joint portion or the vicinity of the joint portion, regardless of each of the vibration conditions.

In the inspection apparatus according to the above aspect, it is preferable that the processing unit determines whether the situation of joining is defective or undefective by means of comparing the physical quantity with a predetermined value.

With the above configuration, it is possible to smoothly determine whether the situation of joining between members is defective or undefective.

An inspection method according to another aspect of the present invention is an inspection method for inspecting a situation of joining between a plurality of members in a joined body including the members joined to and overlapped one another by using the inspection apparatus, wherein the inspection method comprises:

determining whether the situation of joining is defective or undefective by means of, together with applying a plurality of elastic waves to an observation surface of the joined body under a plurality vibration conditions in which one of frequencies, spatial distribution of amplitudes and/or phases of the elastic waves are different from that of each other conditions, detecting spatial distribution of physical quantities relating to displacement of vibration caused by the elastic waves at joint portions between the members or in the vicinities of the joint portions on the observation surface.

In the inspection method according to the above aspect of the present invention, as described above, by means of applying vibrations in a plurality of different vibration modes to a joined body including a plurality of members joined to and overlapped one another, and detecting the spatial distribution of the physical quantities relating to the displacement caused by the vibrations, the situation of joining between the members is inspected. Thereby, it is possible to perform a quick inspection of the joined body with a simple configuration.

Effect of the Invention

According to the present invention, when inspecting the situation of joining of the joined body, by means of vibrating the joined body under each vibration condition, it is possible to detect the spatial distribution of the physical quantities of the joined body which changes during the vibration. Then, on the basis of the detected spatial distribution of physical quantities, it is determined whether the situation of joining of the joined body is defective or undefective, and it is possible to perform a quick inspection of the joined body.

Accordingly, with a simple configuration in which the spatial distribution of the physical quantities is detected by means of altering the vibration condition to the joined body, it is possible to shorten the inspection time for inspecting the joined body.

DESCRIPTION OF THE EMBODIMENTS

Hereinafter, an inspection apparatus and an inspection method according to the present invention will be described in detail with reference to preferred embodiments shown in the accompanying drawings.

First Embodiment

A first embodiment of an inspection apparatus and an inspection method according to the present invention will be described with reference to FIGS. 1 to 11.

Figure 1:
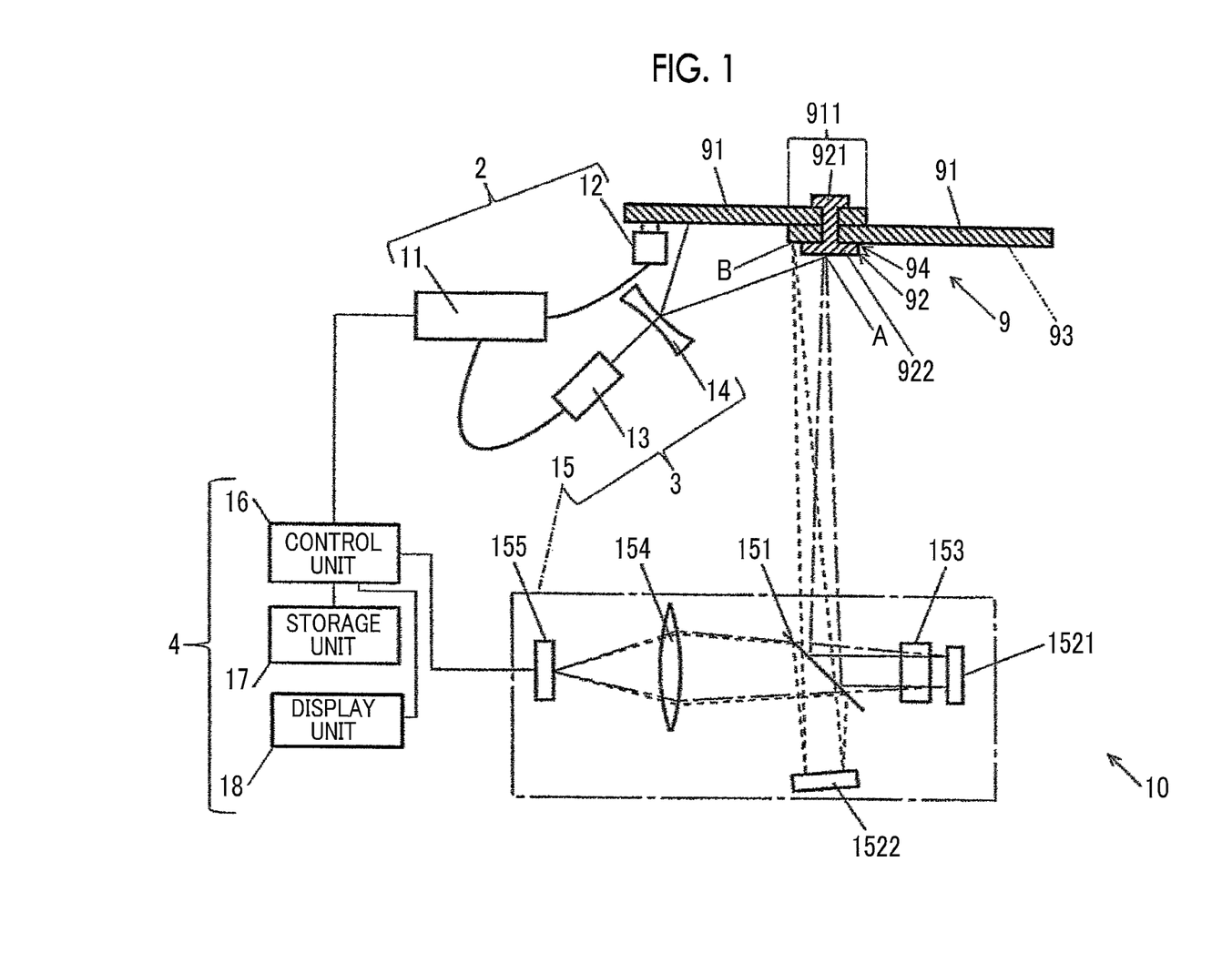
FIG. 1 is a schematic configuration diagram illustrating a first embodiment of an inspection apparatus of the present invention.

The inspection apparatus 10 illustrated in FIG. 1 is used for inspecting a situation of joining of the joined body 9 which is an inspection target object S (hereinafter may be simply referred to as "situation of joining").

Figure 4:
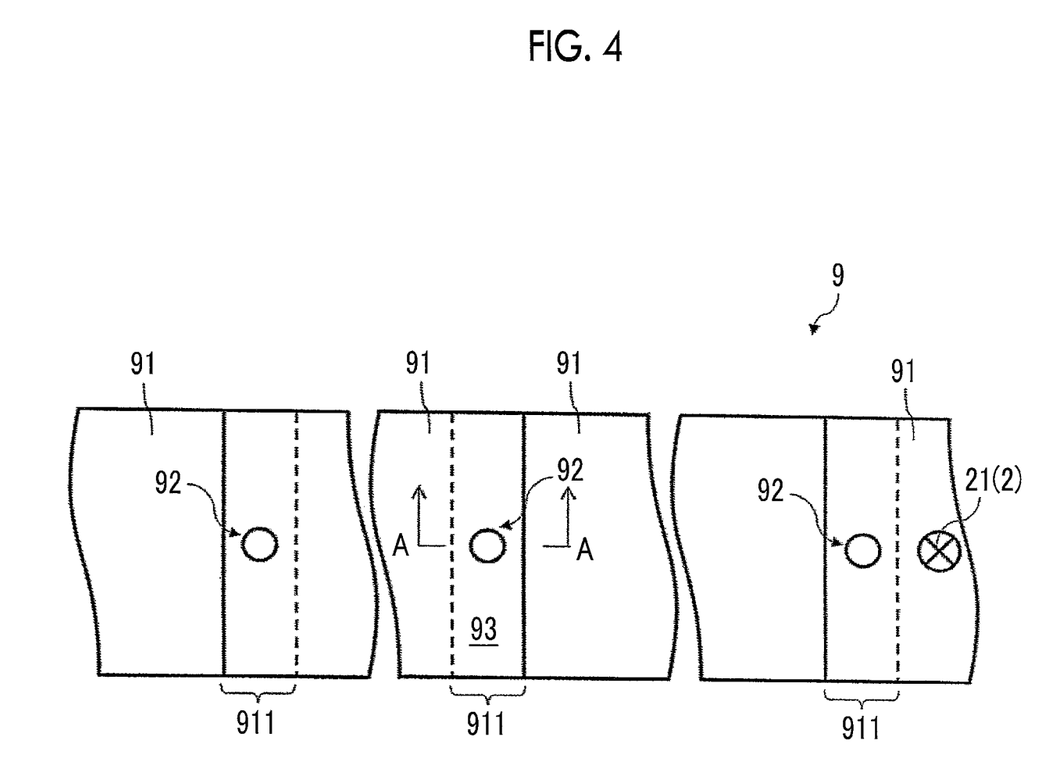
FIG. 4 is a plan view illustrating a joined body to be inspected with the inspection apparatus illustrated in FIG. 1.

The joined body 9 is not particularly limited, and one of the examples is the joined body 9 illustrated in FIG. 4. As illustrated in FIG. 4, the joined body 9 has a plurality of plate members 91 having long shapes along the lateral direction in the drawing. These plate members 91 are arranged along the lateral direction in FIG. 4, and the end portions are overlapped each other in the thickness direction of plates to form an overlapping portion 911. In addition, each overlapping portion 911 is joined with a rivet 92.

Figure 5:
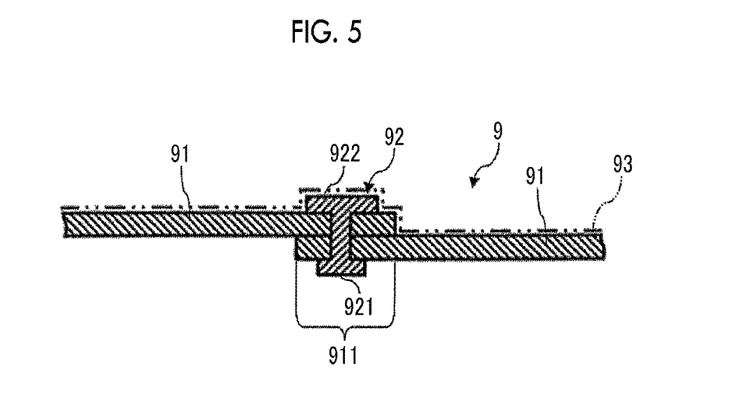
FIG. 5 is a sectional view taken along the line A-A in FIG. 4.

As illustrated in FIG. 5, the head portion 921 of the rivet 92 is positioned on the back side. On the front side of the rivet 92, a caulking portion 922 plastically deformed by caulking is formed at the time of joining the plate members 91 to each other.

As described above, the joined body 9 includes a plurality of plate members 91 and a plurality of rivets 92 as joining members for joining the plate members 91 to each other. Then, the inspection apparatus 10 can inspect the situation of joining between the plate members 91. In this inspection, the front surface of the joined body 9 is the observation surface 93 which is observed at the time of inspecting the situation of joining. In FIG. 5, in order to facilitate understanding, the observation surface 93 is indicated by the two-dot chain line with a reference numeral "93".

The inspection method of the present invention is a method of inspecting the situation of joining of the plate members 91 in the joined body 9 using the inspection apparatus 10 of the present invention.

As illustrated in FIG. 1, the inspection apparatus 10 includes a vibrating unit 2 applying vibration to the joined body 9, a detection unit 3 collectively detecting spatial distribution of physical quantities occurring on the observation surface 93 of the joined body 9 during vibration applied with the vibrating unit 2, and a processing unit 4 storing or displaying the spatial distribution of the physical quantities detected by the detection unit 3. The vibrating unit 2 includes a signal generator 11 and a vibrator 12. The detection unit 3 includes a pulsed laser light source 13, an illumination light lens 14, and a speckle shearing interferometer 15. The processing unit 4 includes a control unit 16, a storage unit 17, and a display unit 18. Hereinafter, the configuration of each part will be described.

The signal generator 11 is connected to the vibrator with a cable, and generates and transmits an AC electric signal to the vibrator 12.

The vibrator 12 is used with being brought into contact with the observation surface 93 of the joined body 9, receives the AC electric signal from the signal generator 11, converts the signal into mechanical vibration, and applies the mechanical vibration to the joined body 9. Thereby, the elastic wave is excited in the joined body 9.

The contact position of the vibrator 21 with respect to the observation surface 93 is not particularly limited. For example, as illustrated in FIG. 4, when the plate member 91 has a rectangular shape in plan view, the contact position can be set at the center portion in the short side direction of the plate member 91. Further, the contact position of the vibrator 12 can be on the overlapping portion 911 or can be a position deviated from the overlapping portion 911. Further, the contact position of the vibrator 12 can be on the rivet 92 or can be a position deviated from the rivet 92.

Further, the vibrating unit 2 is capable of applying vibrations under a plurality of vibration conditions having different frequencies (vibration modes) to the observation surface 93 of the joined body 9. In the present embodiment, there are a first vibration condition for giving vibration at a first frequency and a second vibration condition for giving vibration at a second frequency higher than the first frequency. Then, the vibrating unit 2 applies vibration under the first vibration condition and vibration under the second vibration condition at different timings. As a result, there can be obtained grayscale images (images IM 1 and IM 2 to be described later) reflecting the spatial distribution of the vibration amplitudes occurring on the observation surface 93 under the respective conditions of the first vibration condition and the second vibration condition. These images are used for determining whether the situation of joining of the joined body 9 is defective or undefective.

In the present embodiment, the vibrating unit 2 is configured to apply vibrations under a plurality of vibration conditions having different frequencies at different timings. However, the present invention is not limited to this. For example, the vibrating unit 2 can be configured to apply vibrations under a plurality of vibration conditions having different frequencies at the same timing. In this case, when frequency analysis is performed after vibration is applied, it can be distinguished which one of the vibration conditions provides the vibration giving the grayscales. Thus, it is possible to determine whether the situation of joining of the joined body 9 is defective or undefective, similarly to the above-mentioned vibration applied at different timings.

The signal generator 11 is also connected to the pulsed laser light source 13 through a cable different from the cable connected to the vibrator 12, thereby transmitting an electric signal having a pulse shape (pulse signal) to the pulsed laser light source 13 at the timing when the AC electric signal has a predetermined phase. The predetermined phase and the timing determined by the predetermined phase are altered during the inspecting the joined body 9 as described later. The pulsed laser light source 13 emits the pulsed laser light on the observation surface 93 when it receives the pulse signal from the signal generator 11 in synchronization with the period of the vibration applied by the vibrating unit 2 during vibration with the vibrating unit 2, that is, is a light source for outputting (light irradiation unit).

The illumination light lens 14 is disposed between the pulsed laser light source 13 and the joined body 9, and include a concave lens. The illumination light lens has a function of expanding the pulsed laser light which come from the pulsed laser light source 13 in the entire region to be measured on the surface of the joined body 9.

The speckle shearing interferometer 15 has a beam splitter 151, a first reflecting mirror 1521, a second reflecting mirror 1522, a phase shifter 153, a condensing lens 154, and an image sensor 155. The beam splitter 151 is a half mirror disposed at a position where the illumination light reflected by the measurement region on the surface of the joined body 9 is incident. The first reflecting mirror 1521 is disposed on the optical path of the illumination light reflected by the beam splitter 151 and the second reflecting mirror 1522 is disposed on the optical path of the illumination light transmitted through the beam splitter 151. The phase shifter 153 is disposed between the beam splitter 151 and the first reflecting mirror 1521, and alters (shifts) the phase of the light passing through the phase shifter 153. The image sensor 155 is disposed on both the optical path of the illumination light transmitted through the beam splitter 151 which is the illumination light reflected by the first reflecting mirror 1521 after reflected by the beam splitter 151, and the optical path of illumination light reflected by the beam splitter 151 which is the illumination light reflected by the second reflecting mirror 1522 after transmitted through the beam splitter 151. The condensing lens 154 is disposed between the beam splitter 151 and the image sensor 155.

The first reflecting mirror 1521 is disposed such that the reflective surface thereof is at an angle of 45° with respect to the reflective surface of the beam splitter 151. On the other hand, the second reflecting mirror 1522 is disposed such that the reflective surface thereof has an angle slightly tilted from 45° with respect to the reflective surface of the beam splitter 151. According to the arrangement of the first reflecting mirror 1521 and the second reflecting mirror 1522, in the image sensor 155, the irradiation light (the chain line in FIG. 1) which is reflected by the first reflecting mirror 1521 at a certain point A on the surface of the joined body 9 (observation surface 93), and the irradiation light (the same dashed line) which is reflected by the second reflecting mirror 1522 at the point B slightly shifted from the point A on the surface, are incident at the same position on the image sensor 155 and interfere with each other. The image sensor 155 has a large number of detection elements and detects with the different detection elements the light beams which are incident on the image sensor 155 through the first reflecting mirror 1521 and the phase shifter 153 from a large number of points (the point A) on the surface of the joined body 9, respectively. Similarly, for the point B, the light beams which are incident on the image sensor 155 through the second reflecting mirror 1522 from a large number of points are detected by different detection elements. In such a manner, an interference image is obtained. In FIG. 1, for example, the point A corresponds to a point on the caulking portion 922 of the rivet 92, and the point B corresponds to a point on the overlapping portion 911 and a point on the plate member 91 with which the caulking portion 922 contacts.

The detection unit 3 having such a configuration is capable of detecting the spatial distribution of physical quantities relating to vibration displacement in the joint portion 94 between the caulking portion 922 of the rivet 92 and the plate member 91 included in the observation surface 93 or in the vicinity thereof during vibration applied by the vibrating unit 2. Here, the "joint portion 94" means the boundary between the plate member 91 and the caulking portion 922 (the boundary between the members), and "the vicinity of the joint portion 94" means a range within 3 to 20 mm from the joint portion 94. The "spatial distribution of physical quantities relating to vibration displacement" is spatial distribution of amplitudes and phases of vibrations on the observation surface 93 and is an interference image observed by the optical interference method in this embodiment. This interference image is obtained with the speckle shearing interferometer 15.

The control unit 16 controls the signal generator 11 and performs data processing on the basis of detection signals obtained from the respective detection elements of the image sensor 155. The storage unit 17 stores detection signals obtained from the respective detection elements of the image sensor 155 and data processed by the control unit 16.

The display unit 18 has, for example, a liquid crystal screen. The display unit 18 is capable of displaying the interference image stored in the storage unit 17, a grayscale image obtained on the basis of a plurality of interference images, and other information (for example, an inspection result obtained by the inspection apparatus 10).

Figure 2:
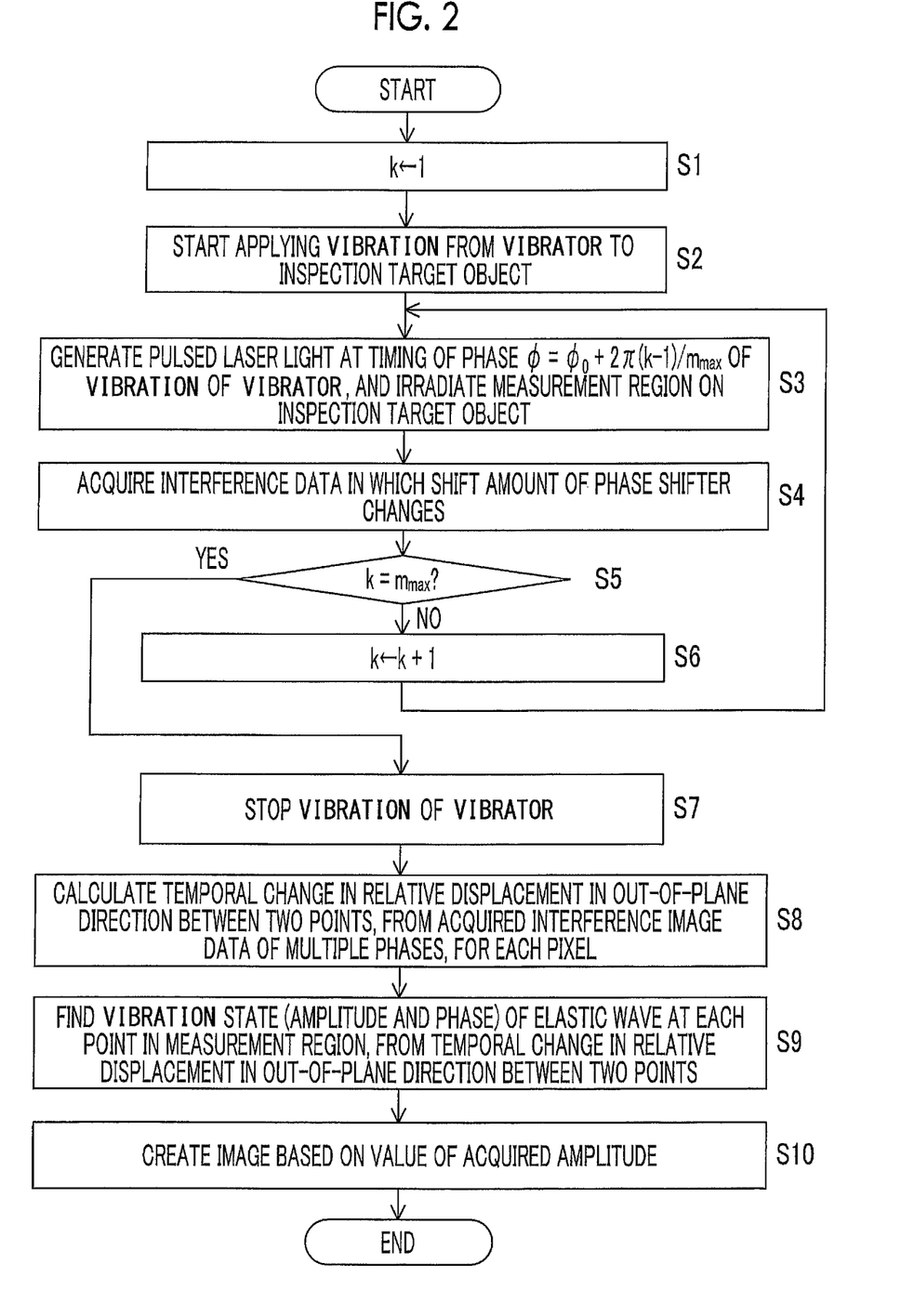
FIG. 2 is a flowchart illustrating a control program of a control unit in the inspection apparatus illustrated in FIG. 1.

Hereinafter, the operation of the inspection apparatus 10 will be described with reference to the flowchart of FIG. 2 and the graph of FIG. 3. In the present embodiment, the phase of vibration of the vibrator 12 is set to be different, and the displacement of the surface (observation surface 93) is measured $m_{max} \geq 3$ times. Here, the "phase of vibration of the vibrator 12" is a phase of the AC electric signal transmitted from the signal generator 11 to the vibrator 12 and corresponds to the phase of the elastic wave excited in the joined body 9 at a point where the vibrator 12 comes into contact with. In the following description, each operation of the measurement of the surface displacement is expressed as "k-th measurement" by using the numerical value k (any natural number between 1 and $m_{max}$). In the following description, as first and the simplest example, all steps will be described in the case of $m_{max}=3$, and then the case where $m_{max}$ is a larger number will be described.

First, the initial value of k is set to 1 (step S1), and, by transmitting an AC electric signal from the signal generator 11 to the vibrator 12, application of vibration from the vibrator 12 to the joined body 9 as the inspection target object S is started (step S2). Thereby, the elastic wave is excited in the joined body 9. It should be noted that, in step S2, vibration is applied at the first frequency or vibration is applied at the second frequency.

Next, at each timing where the phase of the vibration of the vibrator 12 is represented by $[\phi_0+2\pi(k-1)/m_{max}]$ on the basis of a predetermined initial value $\phi_0$ (for example, $\phi_0=0$), the signal generator 11 transmits a pulse signal to the pulsed laser light source 13. Since k=1 at this stage, the phase of the vibration of the vibrator 12 when the pulse signal is transmitted is $\phi_0$. The pulsed laser light source 13 repeatedly outputs the illumination light as the pulsed laser light every time it receives the pulse signal. The diameter of the illumination light is expanded with the illumination light lens 14, and the illumination light is emitted to the entire measurement region on the surface of the joined body 9 (step S3).

The illumination light is reflected on the surface of the joined body 9 and is incident on the beam splitter 151 of the speckle shearing interferometer 15. A part of the illumination light is reflected by the beam splitter 151, passes through the phase shifter 153, is thereafter reflected by the first reflecting mirror 1521, and passes through the phase shifter 153 again, and then a part thereof passes through the beam splitter 151 and is incident on the image sensor 155. The rest of the illumination light incident on the beam splitter 151 is transmitted through the beam splitter 151 and reflected by the second reflecting mirror 1522, and a part thereof is reflected by the beam splitter 151 and incident on the image sensor 155. As described above, in the image sensor 155, irradiation light beams reflected from a large number of points on the surface of the joined body 9 are respectively detected by different detection elements.

While the illumination light as the pulsed laser light is being output repeatedly, the phase shifter 153 continuously alters (shifts) the phase of the irradiation light passing through the phase shifter 153 (that is, the irradiation light reflected at the point A). Thereby, the phase difference between the irradiation light reflected at the point A and the irradiation light reflected at the point B continuously changes, and during the change, each detection element of the image sensor 155 continuously detects an intensity of the interference light due to interference between the two irradiation light beams (step S4). FIG. 3(a) illustrates, as a graph, an example of an amount of phase shift given by the phase shifter 153 and the intensity of the interference light detected by the detection element of the image sensor 155 obtained when the vibration phase of the vibrator 12 is $\phi_0$. In FIG. 3, the relationship in which the detected intensity varies sinusoidally with respect to the amount of phase shift is shown as a continuous curve. However, discrete data is actually observed, and thus the above continuous sinusoidal waveform is reproduced by the least-square method or the like based on the observed data. Therefore, it is necessary to detect the intensity with at least three different phase shift amounts.

Subsequently, in step S5, it is checked whether or not the value of k has reached $m_{max}$. Since this stage is still k=1 and $m_{max}$ (3 in this example) has not been reached, the determination in step S5 is "NO". If "NO", the process proceeds to step S6, where the value of k is incremented by 1 to be "2" (the case where the determination in step S5 is "YES" will be described later).

Next, returning to step S3, at every timing when k=2 at the phase of vibration of the vibrator 12 equal to [$\phi_0+2\pi(k-1)/m_{max}$], that is, at every timing when [$\phi_0+2\pi/3$]≡$\phi$, the signal generator 11 transmits a pulse signal to the pulsed laser light source 13, and then the pulsed laser light source 13 repeatedly irradiates the surface of the joined body 9 with the illumination light as the pulsed laser light at the timing of receiving the pulse signal. Then, while the phase shifter 153 alters (shifts) the phase of the irradiation light reflected at the point A to at least three values, each detection element of the image sensor 155 continuously detects the intensity of the interference light of the irradiation light, which is reflected at the point A and passes through the phase shifter 153 and the like, and the irradiation light reflected at the point B (step S4).

Figure 3:
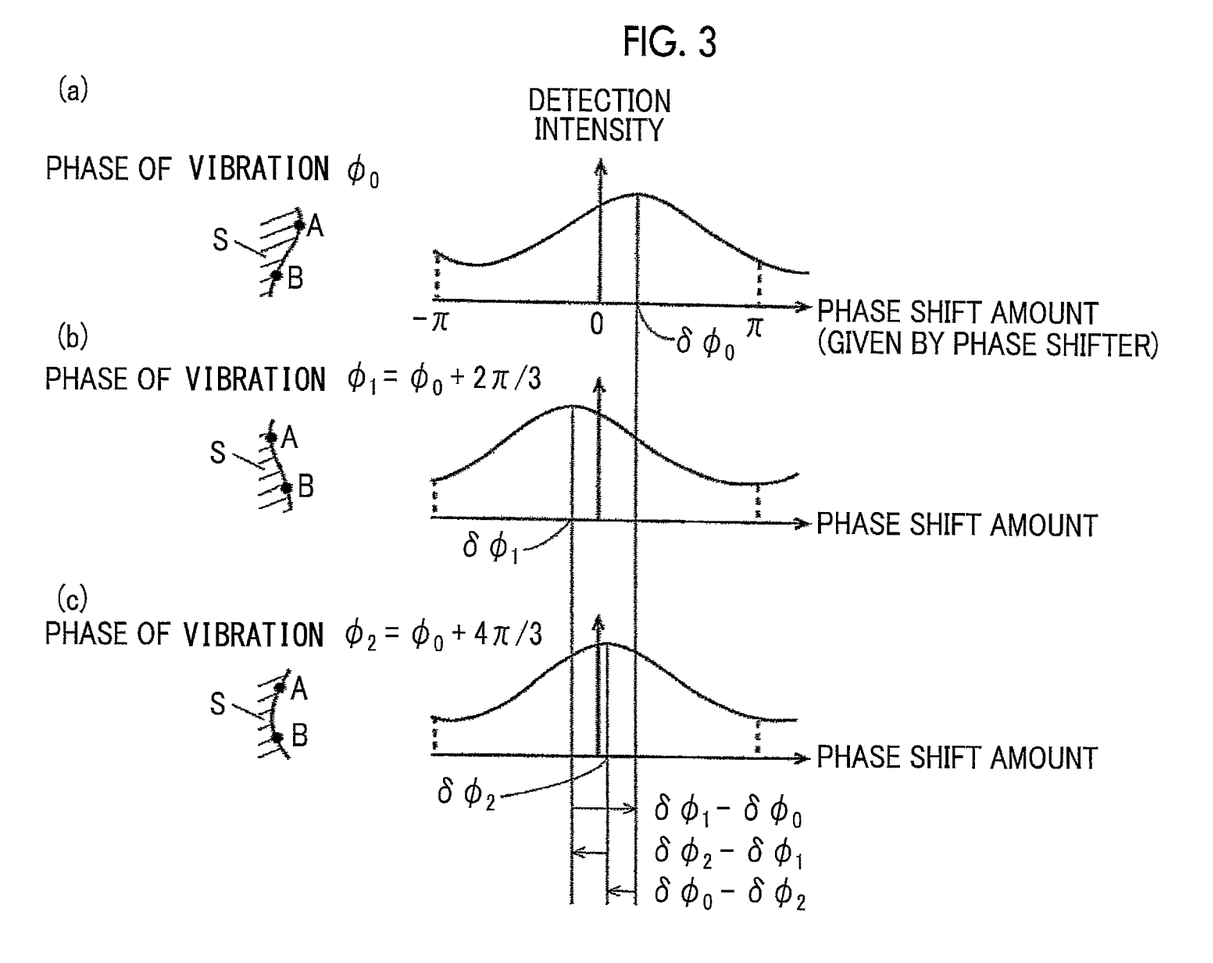
FIG. 3 is a graph for explaining a principle of detecting spatial distribution of physical quantities by the inspection apparatus illustrated in FIG. 1.

FIG. 3(b) illustrates, as a graph, an amount of phase shift given by the phase shifter 153 and the intensity of the interference light detected by the detection element of the image sensor 155 obtained when the vibration phase of the vibrator 12 is $\phi 1$. Comparing FIG. 3(b) with FIG. 3(a) mentioned above, the peak position of the intensity of the interference light is shifted by $\delta\phi_1-\delta\phi_0$. This shift indicates that the phase difference between the optical path from the point A and the optical path from the point B alters due to the difference in phase of the vibration of the vibrator 12 at the time of detection. The shift in phase difference of this optical path indicates that the relative displacement of the points A and B in the out-of-plane direction changes.

After executing the operation in step S4 at k=2 in such a manner, $m_{max}$ (=3) has not been reached yet in step S5. Thus, the determination result is "NO", and the value of k is incremented by 1 to be "3" in step S6. Thereafter, returning to step S3, at every timing when k=3 at the phase of the AC electric signal equal to [$\phi_0+2\pi(k-1)/m_{max}$], that is, at every timing when [$\phi_0+4\pi/3$]≡$\phi_2$, the pulsed laser light source 13 repeatedly irradiates the surface of the joined body 9 with the illumination light which is pulsed laser light, and each detection element of the image sensor 155 detects the intensity of the interference light (step S4). Thus, as illustrated in FIG. 3(c), it is possible to obtain a relationship between the intensity of the interference light and the amount of phase shift given by the phase shifter 153 when the phase of the AC electric signal is $\phi_2$.

Thereafter, in step S5, since the value of k is 3 and has reached $m_{max}$, the determination result thereof is "YES", and the process proceeds to step S7. In step S7, transmission of the AC electric signal from the signal generator 11 to the vibrator 12 is stopped, whereby the vibrator 12 stops vibrating.

Next, in steps S8 and S9, the vibration state (amplitude and phase) of the elastic wave at each point of the measurement region is obtained by the following operation.

In step S8, a temporal change in relative displacement in the out-of-plane direction between the two points is calculated from the obtained interference image data of the plurality of phases for each of the pixels of the interference image, and in step S9, from the temporal change of the relative displacement in the out-of-plane direction between the two points, the vibration state (amplitude and phase) of the elastic wave at each point (each measurement point) in the measurement region is obtained.

Specifically, first, for each detection element of the image sensor, the maximum output phase shift amounts $\delta\phi_0$, $\delta\phi_1$, and $\delta\phi_2$ at which the output of the detection element is maximized while the amount of phase shift given by the phase shifter 153 is changed are respectively obtained at the phases $\phi_0$, $\phi_1$ and $\phi_2$ of each vibration (refer to the graphs of FIGS. 3(a) to 3(c)). Further, differences ($\delta\phi_1-\delta\phi_0$), ($\delta\phi_2-\delta\phi_1$), and ($\delta\phi_0-\delta\phi_2$) between the maximum output phase shift amounts with different phases of vibration are obtained (step S8). The differences between these three maximum output phase shift amounts are represented by three groups of two pieces of data relating to the relative displacements of the points A and B in the out-of-plane direction at different phases (that is, different times) of the vibration of the vibrator 12. On the basis of these three groups of relative displacements, values of three parameters such as the amplitude of vibration, the phase of vibration, and the central value of vibration (DC component) at each point of the measurement region can be obtained (step S9).

An image is created on the basis of amplitude and phase values of vibration of each point obtained in such a manner (step S10). For example, as the amplitude of the measurement point is larger, the luminance of the pixel corresponding to the measurement point is increased, whereby the difference in amplitude of the vibration may be represented by the difference in contrast (grayscale) of the image.

Steps S1 to S10 described above are performed under each vibration condition of the first vibration condition and the second vibration condition. For example, steps S1 to S10 under the first vibration condition are performed, and then steps S1 to S10 under the second vibration condition are performed.

Figure 6:
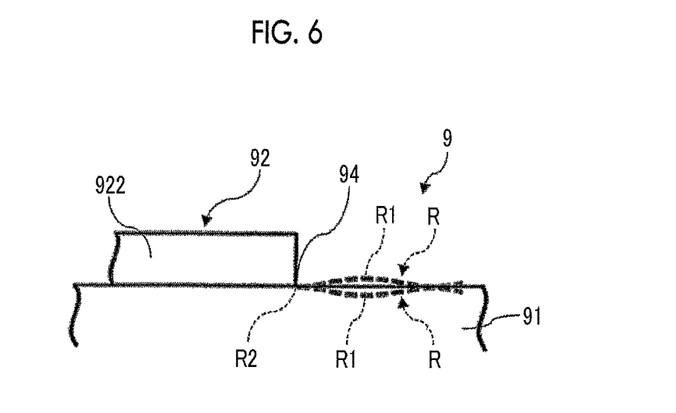
FIG. 6 is a side view schematically illustrating a vibration state of a joined body (situation of joining is undefective) under a first vibration condition.
Figure 7:
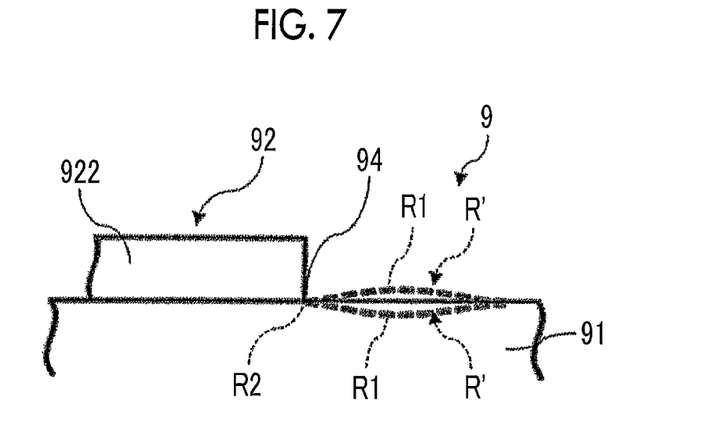
FIG. 7 is a side view schematically illustrating a vibration state of a joined body (situation of joining is undefective) under a second vibration condition.
Figure 8:
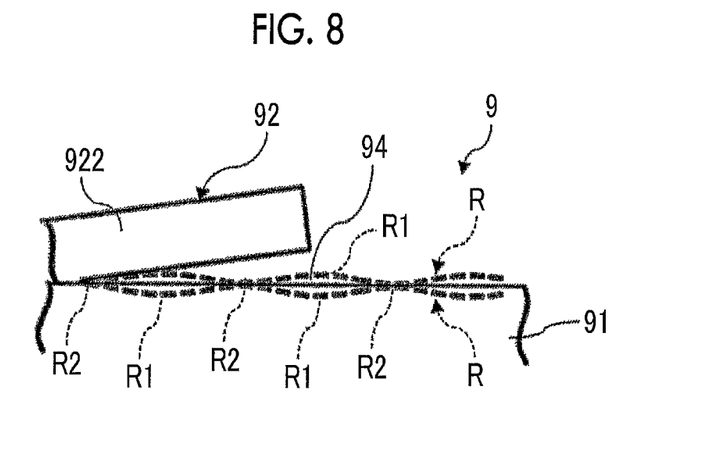
FIG. 8 is a side view schematically illustrating a vibration state (situation of joining is defective) of a joined body under a first vibration condition.
Figure 9:
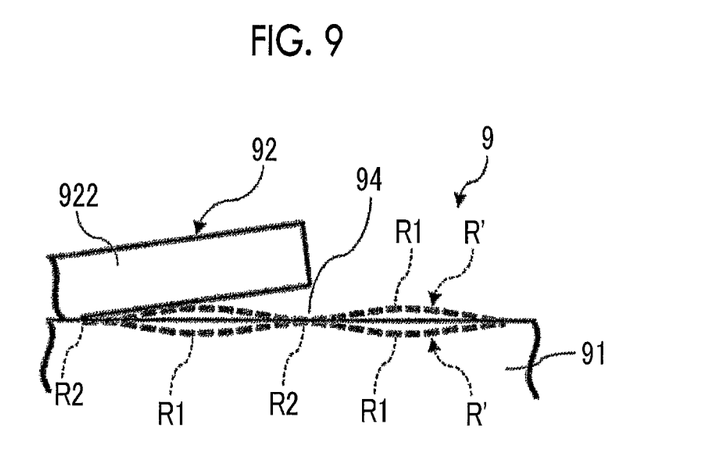
FIG. 9 is a side view schematically illustrating a vibration state (situation of joining is defective) of a joined body under a second vibration condition.

Incidentally, the situation of joining of the joined body 9 is undefective or defective. FIGS. 6 and 7 show a case where the situation of joining is undefective. FIGS. 8 and 9 show a case where the situation of joining is defective.

The inspection apparatus 10 is capable of inspecting whether the situation of joining is undefective or not. The reason why the defective or undefective situation of joining occurs is largely depend on the joining force generated by the rivet 92.

When the situation of joining is undefective, the joining force generated by the rivet 92 is usually sufficient. As a result, as illustrated in FIGS. 6 and 7, at the joint portion 94 between the caulking portion 922 of the rivet 92 and the plate members 91, these are in close contact with each other. Further, in this case, the plate members 91 are securely joined to each other.

When the joined body 9 on the condition that the situation of joining is undefective is vibrated under the first vibration condition, as illustrated in FIG. 6, the observation surface 93 waved, that is, a stationary wave R wherein an anti-node R1 at which the amplitude is the maximum and a node R2 at which the amplitude becomes zero are alternately formed occurs on the observation surface 93. At this time, since the joint portion 94 is a fixed end for the stationary wave R, the amplitude is zero. Therefore, the stationary wave R becomes the node R2 at the joint portion 94.

In addition, when the joined body 9 on the condition that the situation of joining is undefective is vibrated under the second vibration condition, as illustrated in FIG. 7, a stationary wave R' occurs on the observation surface 93. At this time, since the joint portion 94 also becomes a fixed end for the stationary wave R', the amplitude is zero. Therefore, the stationary wave R' becomes the node R2 at the joint portion 94.

Thus, regardless of whether the joined body 9 on the condition that the situation of joining is undefective is vibrated under the first vibration condition or vibrated under the second vibration condition, the stationary wave R' becomes the node R2 at the joint portion 94.

On the other hand, when the situation of joining is defective, on the contrary to the above, the joining force generated by the rivet 92 is insufficient. In this case, as illustrated in FIGS. 8 and 9, a gap is formed in the joint portion 94, and the plate members 91 are easily rattled by the gap.

When the joined body 9 on the condition that the situation of joining is defective is vibrated under the first vibration condition, as illustrated in FIG. 8, the observation surface 93 waved, that is, the stationary wave R occurs on the observation surface 93. At this time, the joint portion 94 becomes a free end for the stationary wave R, and the stationary wave R may be either of the anti-node R1 and the node R2. In FIG. 8, the stationary wave R becomes the anti-node R1 at the joint portion 94.

In addition, when the joined body 9 on the condition that the situation of joining is defective is vibrated under the second vibration condition, as illustrated in FIG. 9, a stationary wave R' occurs on the observation surface 93. At this time, since the joint portion 94 is also a free end for the stationary wave R', the stationary wave R' may be either of the anti-node R1 and the node R2. In FIG. 9, the stationary wave R' becomes the node R2 at the joint portion 94.

In this manner, the joined body 9 on the condition that the situation of joining is defective has the anti-node R1 or the node R2 at the joint portion 94 under the first vibration condition or the second vibration condition.

Then, vibration is applied to the joined body 9 in the state illustrated in from FIGS. 6 to 9 under each vibration condition of the first vibration condition and the second vibration condition, and a grayscale image is obtained in accordance with the above-mentioned steps from S1 to S10. This grayscale image can be displayed on the display unit 18. The image displayed on the display unit 18 is the image IM1 illustrated in FIG. 10 and the image IM2 illustrated in FIG. 11.

Figure 10:
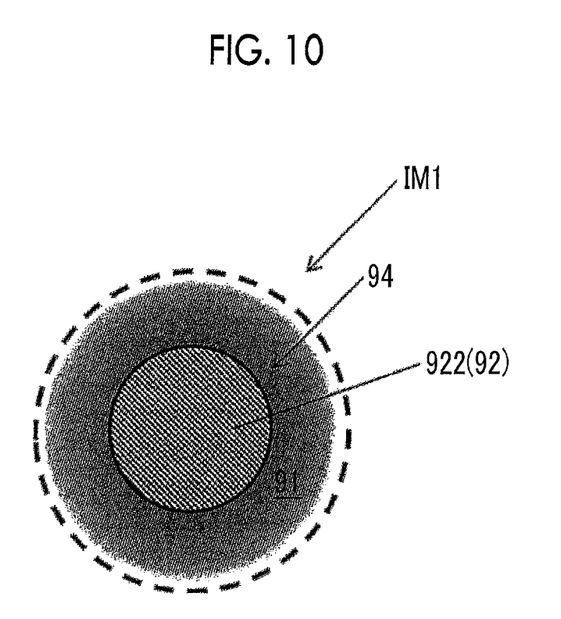
FIG. 10 is a diagram schematically illustrating a grayscale image of a joined body (situation of joining is undefective).
Figure 11:
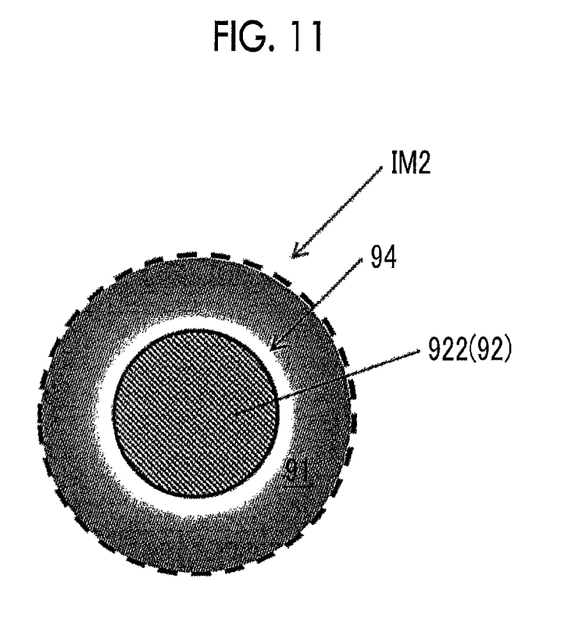
FIG. 11 is a diagram schematically illustrating a gray image of a joined body (situation of joining is defective).

In the image IM1 and the image IM2, as the amplitude (change in physical quantity) of the measurement point increases, the luminance of the pixel corresponding to the measurement point increases, and the density in the grayscale image is low. Conversely, as the amplitude of the measurement point (change in physical quantity) decreases, the luminance of the pixel corresponding to that measurement point decreases, and the density in the grayscale image is high. In this manner, the difference in amplitude of the vibration is represented by the difference in gray level of the image.

In the image IM1, the density at the joint portion 94 or in the vicinity thereof is high and is expressed in dark color. According to this result, it is possible to determine that the vibration amplitude at the joint portion 94 is small and that the situation of joining at the joint portion 94 is undefective. On the other hand, in the image IM2, the density at the joint portion 94 or in the vicinity thereof is low and is expressed in light color. According to this result, it is possible to determine that the vibration amplitude at the joint portion 94 or in the vicinity thereof is large and that the situation of joining at the joint portion 94 is defective.

When the image IM1 is obtained under any one of the first vibration condition and the second vibration condition, the processing unit 4 determines that the vibration amplitude (change in physical quantity) at the joint portion 94 or in the vicinity thereof is small and that the situation of joining at the joint portion 94 is undefective.

In contrast, when the image IM2 is obtained under at least one of the first vibration condition and the second vibration condition, the processing unit 4 determines that the vibration amplitude (change in physical quantity) at the joint portion 94 or in the vicinity thereof is large and that the situation of joining at the joint portion 94 is defective.

When determining whether the situation of joining is undefective, it is preferable that the processing unit 4 compares the physical quantity with a threshold value (predetermined value) and performs the determination. In this case, for example, a threshold value (predetermined value) of density (luminance) is set, and this threshold value is compared with the actually measured value of the actual density of the joint portion 94 in the image IM1 or the image IM2. If the actually measured value is equal to or greater than the threshold value, it can be determined that the density is expressed in light color, and if the value is less than the threshold value, it can be determined that the density is expressed in dark color. It is preferable that the threshold value is stored in advance in the storage unit 17. Further, at the processing unit 4 the threshold value may be appropriately changed.

As described above, when determining whether the situation of joining of the joined body 9 is undefective, it is possible to obtain the image IM1 and the image IM2 by vibrating the joined body 9 under each vibration condition. Independent of each vibration condition, when the change in physical quantity at the joint portion 94 or in the vicinity thereof is smaller than the change in physical quantity in the area excluding the joint portion or the vicinity thereof, the processing unit 4 determines that the state of joining is undefective. In contrast, when the change in physical quantity at the joint portion 94 or in the vicinity thereof becomes smaller or larger than the change in physical quantity in the region excluding the joint portion 94 or the vicinity thereof according to each vibration condition, the processing unit 4 determines that the situation of joining is defective.

As described above, the inspection apparatus 10 is capable of quickly inspecting whether the situation of joining of the joined body 9 is undefective on the basis of the image IM1 and the image IM2.

Further, according to the above method, it is possible to collectively inspect whether the situation of joining of the joined body 9 using the rivets 92 present at three locations is undefective, and it is possible to quickly inspect the joined body.

Second Embodiment

Hereinafter, a second embodiment of the inspection apparatus and the inspection method of the present invention will be described with reference to FIG. 12, but the differences from the above-mentioned embodiment will be mainly described, and description of similar items will be omitted.

The present embodiment is the same as the first embodiment except that the vibrating points for the joined body are different.

Figure 12:
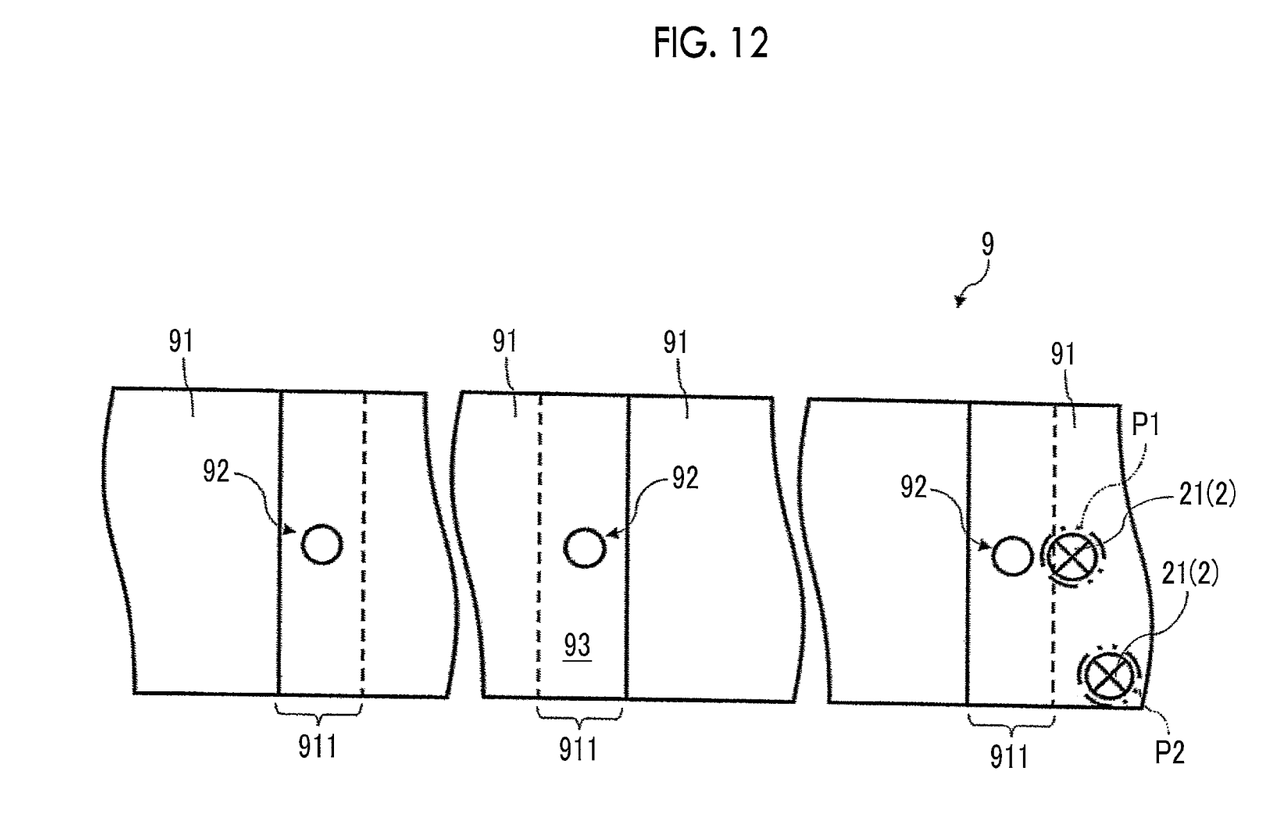
FIG. 12 is a plan view illustrating a joined body to be inspected of an inspection apparatus (a second embodiment) of the present invention.

As illustrated in FIG. 12, in the present embodiment, the vibrating unit 2 is capable of changing the contact position of the vibrator 12 on the observation surface 93 to the position P1 and the position P2. The position P1 is the central portion in the short side direction of the plate member 91. The position P2 is located below the position P1 and is on the right side therefrom in a small distance in FIG. 12. Since the vibrator 12 is disposed at such a position, the vibrating unit 2 is capable of vibrating the observation surface 93 of the joined body 9 under the two vibration conditions in which the phases of vibrations are shifted, that is, in which the phases are different. In such a manner, it is also possible to obtain a grayscale image under each vibration condition. Then, this image can be used for determining whether the situation of joining is defective or undefective.

It should be noted that the vibrator 12 may be sequentially disposed at the position P1 and the position P2, and apply vibration. In this case, the vibration in the state in which the vibrator 12 is disposed at the position P1 and the vibration in the state in which the vibrator 12 is disposed at the position P2 are performed at different timings.

Alternatively, two vibrators 12 may be provided, and the vibrators 12 may be disposed one by one at the position P1 and the position P2, respectively, and may collectively apply vibrations. In this case, the vibration in the state in which the vibrator 12 is disposed at the position P1 and the vibration in the state in which the vibrator 12 is disposed at the position P2 are performed at different timings.

In the present embodiment, the vibrating unit 2 changes the contact position of the vibrator 12 to two positions, and applies vibrations under two vibration conditions having different phases, but the present invention is not limited to this. For example, the vibrating unit 2 can change the contact position of the vibrator 12 to three or more positions. In this case, the vibrating unit 2 is capable of applying vibrations under three or more vibration conditions having different phases.

By moving the vibrator 12 from the position P1 to the position P2, it is also possible to change the spatial distribution of the amplitude on the observation surface 93. Thereby, it is also possible to determine whether the situation of joining is undefective.

While the inspection apparatus and the inspection method of the present invention have been described with reference to the embodiments illustrated in the drawings, the present invention is not limited thereto. In addition, each unit constituting the inspection apparatus of the present invention can be replaced with an any component capable of exerting the same function, and an any component may be added.

In addition, it should be considered that each disclosed embodiment is an example in all respects and is not restrictive. The scope of the present invention is defined not by the description of the above-mentioned embodiment but by the scope of claims, and includes the scope of claims, the equivalents thereof, and all changes (modifications) within the scope.

Further, the inspection apparatus and the inspection method of the present invention may be any combination of two or more configurations (features) among the above-mentioned embodiments.

In the above example, $m_{max}=3$, but by choosing $m_{max}$ larger than the number represented by [2n+1] (n is a natural number of 2 or more), the n-th order component (n-th harmonic component) of the elastic wave excited in the joined body 9 can be detected. That is, since (2n+1) or more groups of the relative displacements of the points A and B in the out-of-plane direction are obtained, it is possible to obtain (2n+1) parameter values such as the amplitude of the fundamental wave, the phase of the fundamental wave, the amplitude of the second harmonic, the phase of the second harmonic, . . . the amplitude of the n-th harmonic, the phase of the n-th harmonic, and the DC component of the elastic wave.

In the above-mentioned embodiment, while the signal generator 11 and the vibrator 12 are connected by a cable (wired) and the signal generator 11 and the pulsed laser light source 13 are connected by a cable, those may be wirelessly connected. In particular, it is preferable that the signal generator 11 and the vibrator 12 are wirelessly connected. Since the signal generator 11 and the vibrator 12 are wirelessly connected, with bringing the vibrator 12 into contact with the joined body 9, even when the constituent elements of the inspection apparatus other than the vibrator 12 are positioned to be separated from the joined body 9, it is not necessary to provide a long cable. Such a wireless configuration is useful for inspecting a structure having a relatively large joined body 9 such as an aircraft or a train.

In the above-mentioned embodiment, while the vibrator 12 used with being brought into contact with the surface of the joined body 9 is used, a speaker outputting large volume or the like positioned where the vibrator is not brought into contact with the surface of the joined body 9 may be used as the vibrator.

A window and various optical filters may be disposed on the optical path before the light reflected from the joined body 9 in the above-mentioned embodiment is incident on the image sensor, in order to protect the optical component or improve the SN ratio of the apparatus. Examples of the various optical filters include a polarizing plate, a wave plate, a band pass filter, a short pass filter, a long pass filter, and the like.

In the above-mentioned embodiment, the condensing lens 154 is disposed between the beam splitter 151 and the image sensor 155, but the arrangement is not limited thereto. Further, the condensing lens 154 may be composed of a plurality of lenses or a plurality of lens groups. For example, the condensing lens 154 may be composed of the lens group 1 and the lens group 2, where the lens group 1 may be disposed between the joined body 9 and the beam splitter 151, and the lens group 2 may be disposed between the beam splitter 151 and the image sensor 155. At this time, the lens group 1 is configured to be detachable without disassembling the housing of the speckle shearing interferometer 15, and the lens group 1 is replaced with another lens group having a different focal length, resulting in being possible to easily change the angle of view. Thereby, for example, by adjusting the angle of view in accordance with the distance between the joined body 9 and the speckle shearing interferometer 15 and setting the size of an appropriate measurement region, it is possible to inspect defects of the inspection target objects being at various positions. Examples of the lenses that can be used for the lens group 1 are a telephoto lens, a wide-angle lens, a macro lens, a zoom lens, and the like.

In each of the above-mentioned embodiments, while the vibrating unit 2 is configured to apply vibrations under two vibration conditions, the vibrating unit 2 is not limited to this and may be configured to apply vibrations under three or more vibration conditions.

Further, while the vibrating unit 2 applies vibrations under a plurality of vibration conditions having different frequencies in the first embodiment and applies vibrations under a plurality of vibration conditions having different phases in the second embodiment, the vibrating unit 2 is not limited to this. For example, the vibrating unit may apply vibrations under a plurality of vibration conditions having at least one of frequencies, spatial distribution of amplitudes, and phases.

In this case, the vibrating unit may be configured such that one vibrator is brought into contact with the observation surface to apply vibration, and that the contact position of the vibrator on the observation surface is changed so as to change the spatial distribution of the amplitudes and phases of the vibration. Further, the vibrating unit may be configured such that a plurality of vibrators is brought into contact with the observation surface to apply vibrations, and that the condition of the vibration applied by each vibrator is changed so as to change the spatial distribution of the amplitudes and phases of the vibration. In the latter case, the vibrating unit may be configured as a single vibrator unit, such as an vibrator array, having a plurality of separate elements incorporated therein.

In addition, in order to detect the spatial distribution of the physical quantities on the observation surface 93, while the detection unit 3 employs the optical interference method in each of the embodiments, the detection unit 3 is not limited to this, and may employ, for example, a grating projection method, a sampling moiré method, a digital image correlation (DIC) method, and a laser Doppler vibrometer that measures the vibration velocity. In this case, the spatial distribution of the physical quantities of the observation surface 93 varies depending on each method.

Further, in the processing unit 4, the pulsed laser light source 13 may be omitted. In this case, natural light can be used instead of light originated from the pulsed laser light source 13. In this case, colored fine particles may be arranged on the observation surface.

In each of the above-mentioned embodiments, while the processing unit 4 has both the storage unit 17 and the display unit 18, the processing unit 4 is not limited to this, and for example, one of those may be omitted.

In addition, in each of the above-mentioned embodiments, while the processing unit 4 determines whether the situation of joining of the joined body 9 is defective or undefective, the present invention is not limited thereto. For example, a worker may visually compare the grayscale image under each vibration condition and perform the determination.

The image used for determining whether the situation of joining of the joined body 9 is defective or undefective is, for example, such colored image that displays in red a region where the vibration amplitude (change in physical quantity) is greater than the vibration amplitude (change in physical quantity) of another region, and that displays in blue a region where the vibration amplitude (change in physical quantity) is less than the vibration amplitude (change in physical quantity) of another region.

In the above-mentioned embodiments, while the rivets 92 are used for joining members at the joined body 9, the present invention is not limited to this, and for example, bolts may be used, welding such as spot welding may be used, an adhesive may be used, or plastic deformation of a member may be used.

DESCRIPTION OF REFERENCE NUMERALS AND SIGNS 10 inspection apparatus
2 vibrating unit
3 detection unit
4 processing unit
9 joined body
91 plate member
911 overlapping portion
92 rivet
921 head portion
922 caulking portion
93 observation surface
94 joint portion
11 signal generator
12 vibrator
13 pulsed laser light source
14 illumination light lens
15 speckle shearing interferometer
151 beam splitter
1521 first reflecting mirror
1522 second reflecting mirror
153 phase shifter
154 condensing lens
155 image sensor
16 control unit
17 storage unit
18 display unit
A point
B point
IM1 image
IM2 image
P1 position
P2 position
R stationary wave
R' stationary wave
R1 valley
R2 node
S inspection target object
S1 to S10 steps

The invention claimed is:

1. An inspection apparatus comprising:
a vibrating unit that continuously applies a plurality of elastic waves to an observation surface of a joined body including a plurality of members joined to and overlapped with one another, under a plurality of vibration conditions in which one of frequencies, a spatial distribution of amplitudes and/or phases of the elastic waves are different from that of each other conditions,
a detection unit that collectively detects displacement distribution of vibration caused by the elastic waves at joint portions between the members or in the vicinities of the joint portions on the observation surface where the elastic waves applied with the vibrating unit are in a steady state, and
a processing unit that stores or displays the displacement distribution detected with the detection unit.

2. The inspection apparatus according to claim 1, wherein the vibrating unit applies at different timings a plurality of elastic waves having different frequencies as the vibration conditions.

3. The inspection apparatus according to claim 1, wherein the vibrating unit applies at the same timing a plurality of elastic waves having different frequencies as the vibration conditions.

4. The inspection apparatus according to claim 1, wherein the vibrating unit applies the elastic waves to the observation surface by means of bringing a vibrator into contact with the observation surface, and alters the spatial distribution of the amplitudes and the phases of the elastic waves by means of changing a contact position of the vibrator on the observation surface.

5. The inspection apparatus according to claim 1, wherein the vibrating unit applies the elastic waves to the observation surface by means of bringing a plurality of vibrators into contact with the observation surface, and alters the spatial distribution of the amplitudes and the phases of the elastic waves by means of changing the vibration conditions for applying the elastic waves with each of the vibrators.

6. The inspection apparatus according to claim 1, wherein the detection unit includes a light irradiation unit that irradiates the observation surface with light during applying vibration with the vibrating unit.

7. The inspection apparatus according to claim 6, wherein the light irradiation unit emits a pulsed laser light as the light synchronizing with a period of the elastic waves applied with the vibrating unit.

8. The inspection apparatus according to claim 7, wherein the light irradiation unit emits the pulsed laser light having at least three different phase differences from the phase of the elastic waves applied with the vibrating unit.

9. The inspection apparatus according to claim 1, wherein the detection unit acquires an interference image observed by an optical interference method as the displacement distribution.

10. The inspection apparatus according to claim 9, wherein the processing unit determines whether a situation of joining between the members is defective or undefective by means of comparing density of the interference image with a predetermined value.

11. An inspection method for inspecting a situation of joining between a plurality of members in a joined body including the members joined to and overlapped one another, wherein the inspection method comprises:

detecting displacement of vibration caused by a plurality of elastic waves at joint portions between the members or in the vicinities of the joint portions on an observation surface, together with applying the elastic waves to the observation surface of the joined body under a plurality vibration conditions in which one of frequencies, a spatial distribution of amplitudes and/or phases of the elastic waves are different from that of each other conditions, and determining whether the situation of joining is defective or undefective based on a result of the detecting step.

12. The inspection apparatus according to claim 1, wherein the detection unit performs a detection of whether an amplitude of a stationary wave which occurs on the observation surface caused by vibration applied with the vibrating unit shows a first displacement distribution in which the amplitude of the stationary wave becomes zero at a boundary of the members or in the vicinities of the members irrespective of the plurality vibration conditions, or a second displacement distribution in which the amplitude of the stationary wave becomes zero or reaches a maximum depending on the plurality of vibration conditions, and the processing unit determines based on the detection, a situation of joining between the members at a boundary of the joint portions.

13. The inspection apparatus according to claim 12, wherein the processing unit determines that the situation of joining at the joint portions is undefective when the first displacement distribution is detected, and determines that the situation of joining at the joint portions is defective when the second displacement distribution is detected.

* * * * *